(12) United States Patent
Hughes

(10) Patent No.: US 8,667,730 B1
(45) Date of Patent: Mar. 11, 2014

(54) FISHING HOOK REMOVER AND FISH RELEASER

(76) Inventor: Grady Gaston Hughes, Wilmington, NC (US)

(*) Notice: Subject to any disclaimer, the term of this patent is extended or adjusted under 35 U.S.C. 154(b) by 662 days.

(21) Appl. No.: 12/454,431

(22) Filed: May 19, 2009

(51) Int. Cl.
 *A01K 97/18* (2006.01)
(52) U.S. Cl.
 USPC ........................................ 43/53.5; 294/103.1
(58) Field of Classification Search
 USPC ............. 43/53.5; 294/19.3, 99.1, 99.2, 103.1, 294/119.1
 See application file for complete search history.

(56) References Cited

U.S. PATENT DOCUMENTS

| | | | | |
|---|---|---|---|---|
| 1,539,221 | A * | 5/1925 | Tennant | 43/53.5 |
| 1,728,864 | A * | 9/1929 | Kramer | 43/53.5 |
| 1,777,695 | A * | 10/1930 | Jeffery | 43/53.5 |
| 2,054,236 | A * | 9/1936 | Behr | 43/53.5 |
| 2,289,810 | A * | 7/1942 | Tallmadge | 43/53.5 |
| 2,294,758 | A * | 9/1942 | Manske | 43/53.5 |
| 2,512,818 | A * | 6/1950 | Wikarski | 43/53.5 |
| 2,533,230 | A * | 12/1950 | Dixon | 294/19.3 |
| 2,578,289 | A * | 12/1951 | Danielson | 43/53.5 |
| 2,669,055 | A * | 2/1954 | Doerr | 43/53.5 |
| 2,688,816 | A * | 9/1954 | Bondesen | 43/53.5 |
| 2,795,887 | A * | 6/1957 | Lockert | 43/53.5 |
| 2,797,523 | A * | 7/1957 | Dillard | 43/53.5 |
| 2,861,384 | A * | 11/1958 | Kubin | 43/53.5 |
| 2,892,284 | A * | 6/1959 | Shawhan | 43/53.5 |

(Continued)

FOREIGN PATENT DOCUMENTS

| | | | | |
|---|---|---|---|---|
| JP | 10033102 A | * | 2/1998 | A01K 97/18 |
| JP | 10286053 A | * | 10/1998 | A01K 97/18 |

(Continued)

OTHER PUBLICATIONS

Arc Dehooker, Sportsman 16"/Deep-hooked Dehooker (Perfect for small and medium size fish), [retrieved on Aug. 13, 2011], 1 page. Retrieved from the Internet:<URL: http://dehooker4arc.com/store/product.cfm/mode/details/id/405/sportsman-16-deep-hooked-dehooker-perfect-for-small-and-medium-size-fish>.*

*Primary Examiner* — Darren W Ark
(74) *Attorney, Agent, or Firm* — MacCord Mason PLLC

(57) ABSTRACT

A fishing hook remover with a V (10D) shape on the front end. Used to position and secure fishing hooks. The back end of the de-hooker has handle (20) is attached to body (12) and trigger (22) is attached to handle (20). V (10D) is part of jay (10), which is attached to the front end of tubular body (12). Shaft (14) is position in the center of body (12) by front space (26) and back spacer (28). The two spacers (26) and (28) have holes in their centers, which allow shaft (14) to slide. The back end of shaft (14) has a pivotal connection to front link (16). The back end of front link (16) has a pivotal connection to back link (18) and the back end of back link (18) has a pivotal connection to body (12). When trigger (22) is fully out front link (16) and back link (18) form proximately a 90-degree angle at their common connection. When trigger (22) is depressed it causes the angle between front link (16) and back link (18) to increase this in turn push shaft (14) towards point (10A). When trigger (22) is fully depressed shaft (14), front link (16) and back link (18) are in a straight line and the front end of shaft (14) is touching jay (10) at point (10A). Spring (24) pushes trigger (22) out when it is released. Fishing hooks are secured by being pushed against point (10A) by shaft (14).

10 Claims, 14 Drawing Sheets

(56) References Cited

U.S. PATENT DOCUMENTS

Figure 1A:
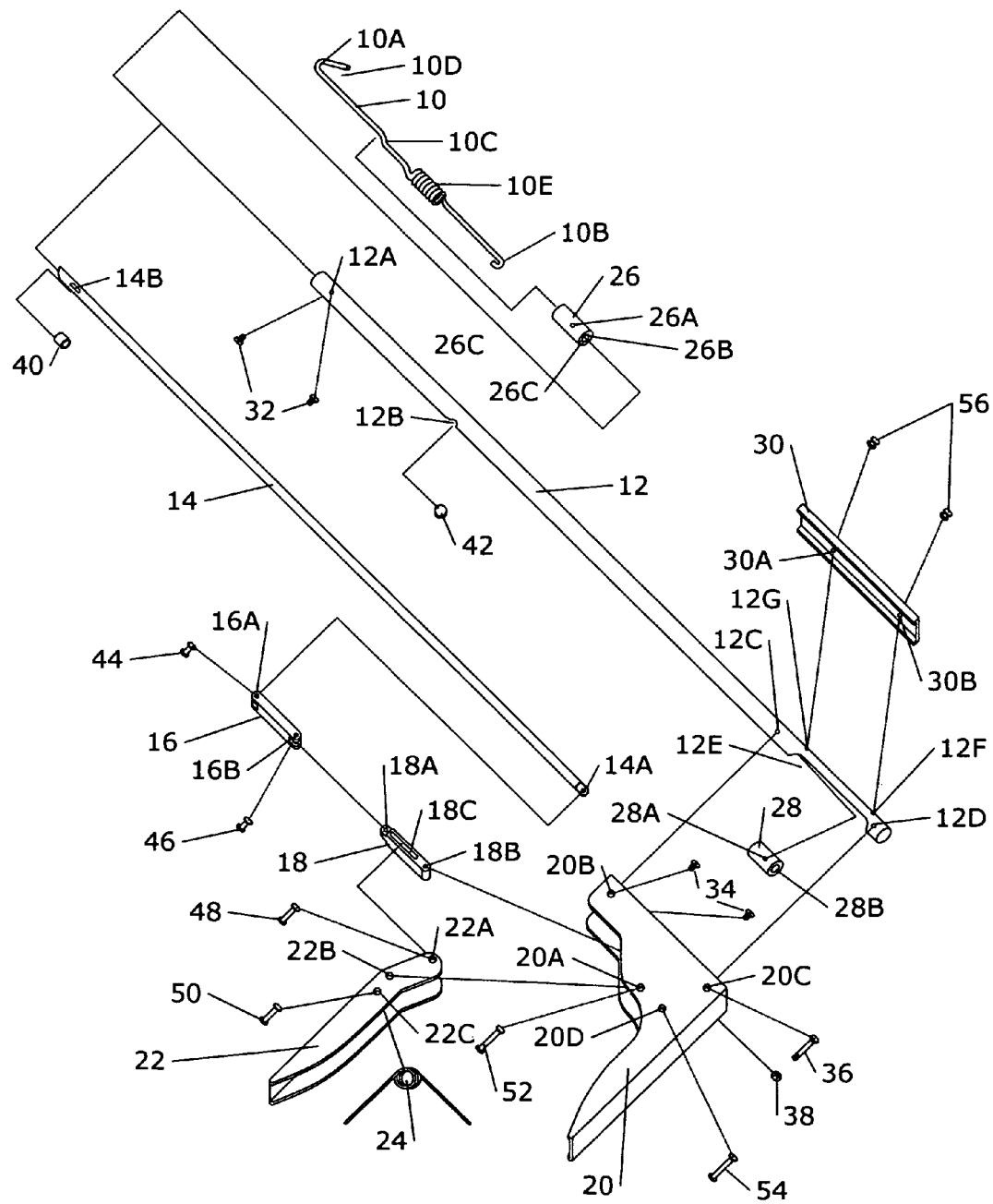
Figure 1B:
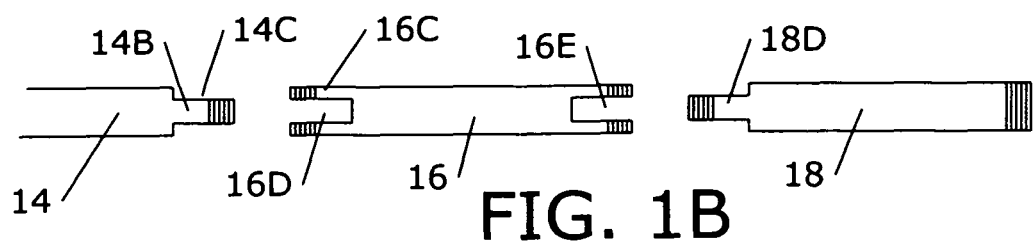
Figure 1C:
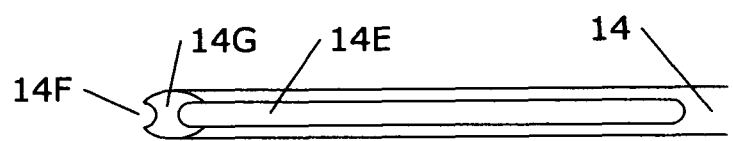
Figure 1D:
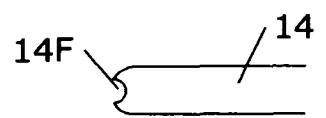
Figure 1E:
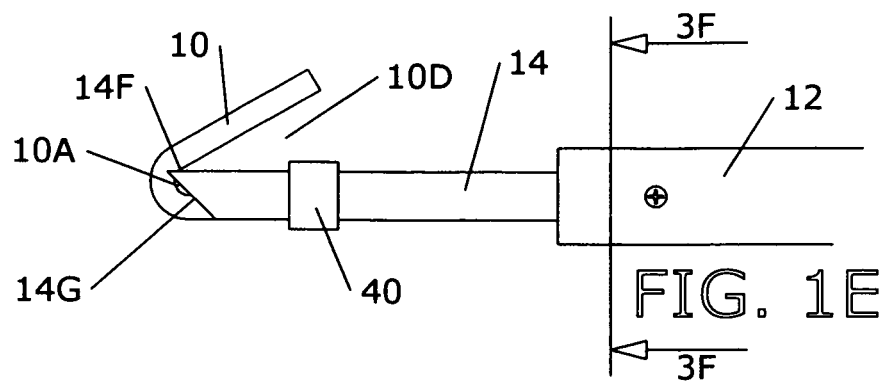
Figure 1F:
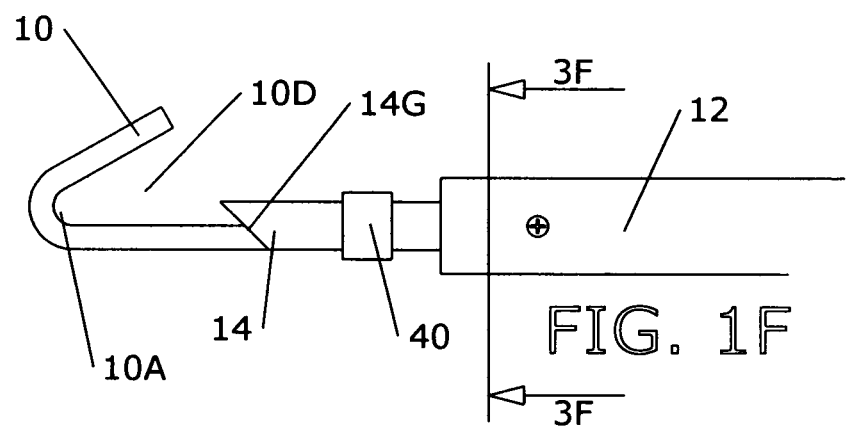
Figure 1G:
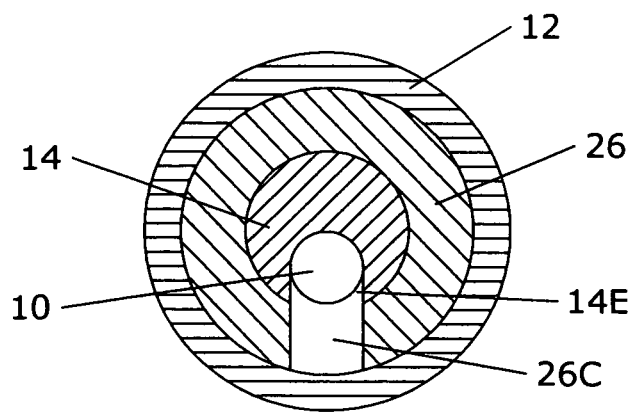
Figure 1H:
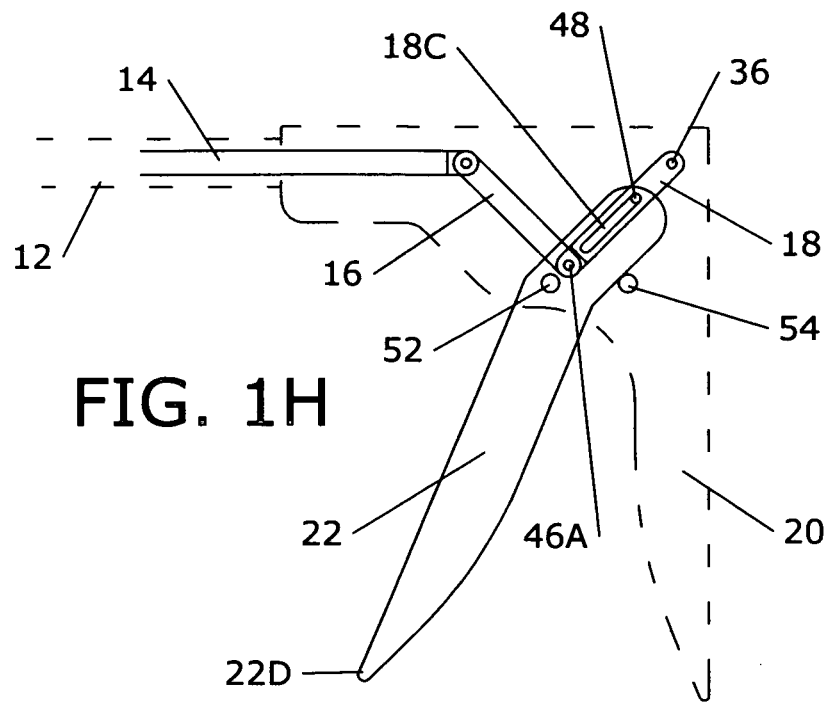
Figure 1I:
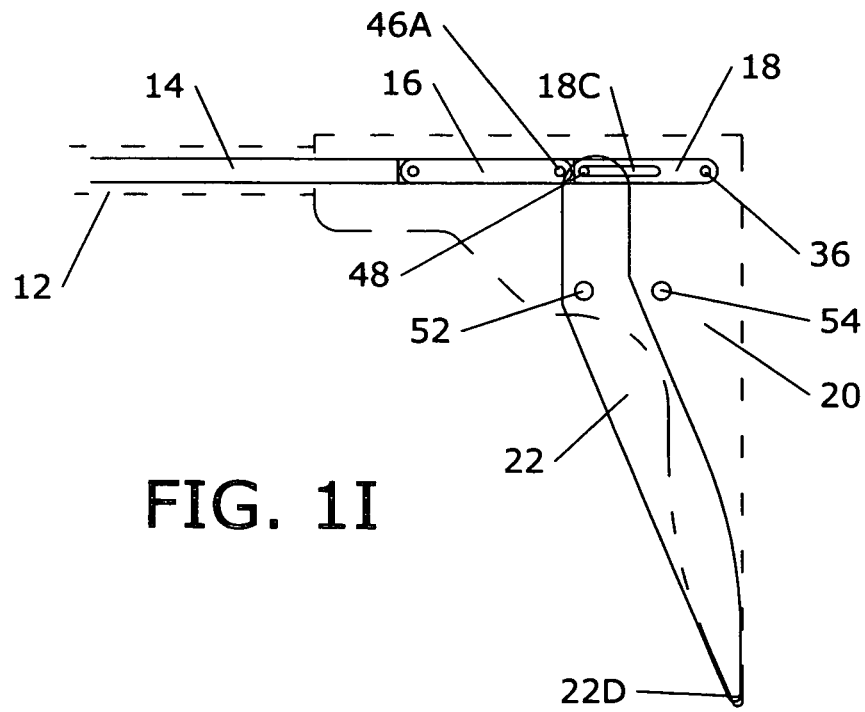
Figure 1J:
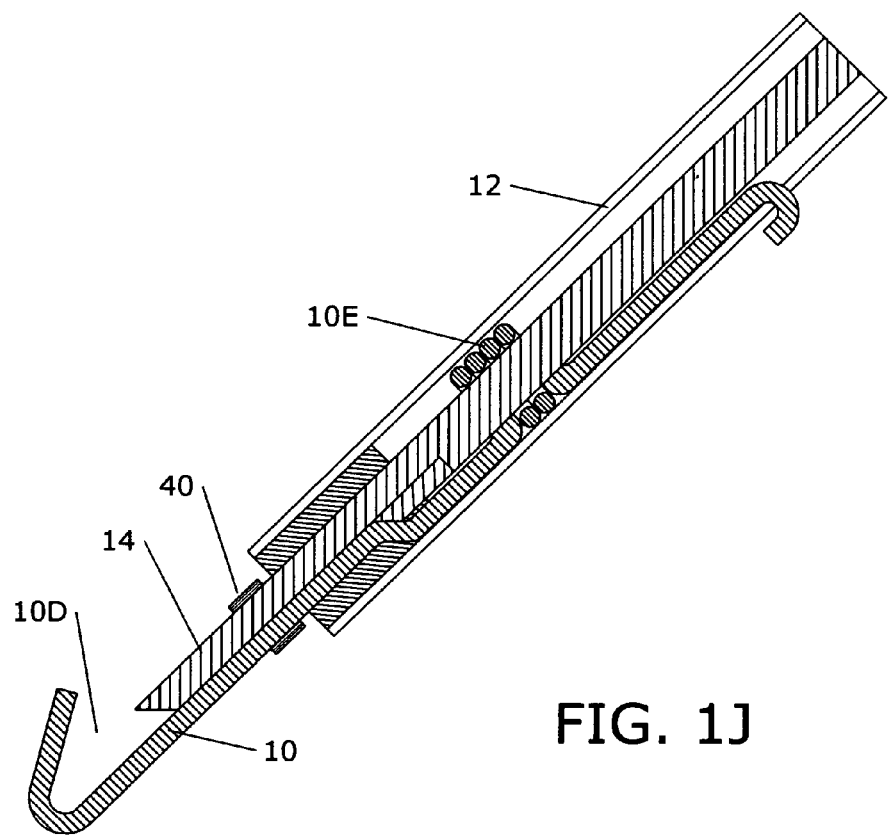
Figure 1K:
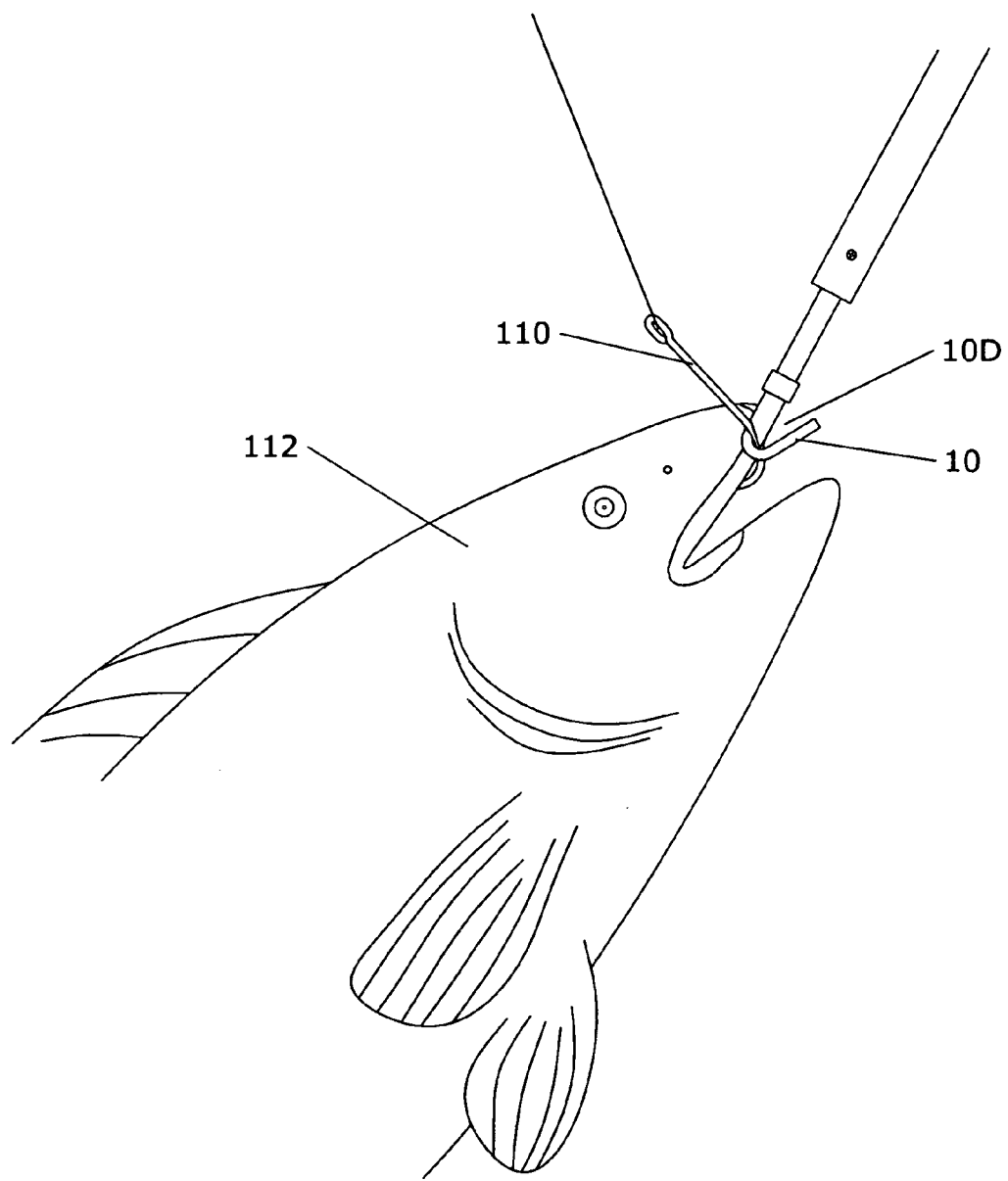
Figure 1L:
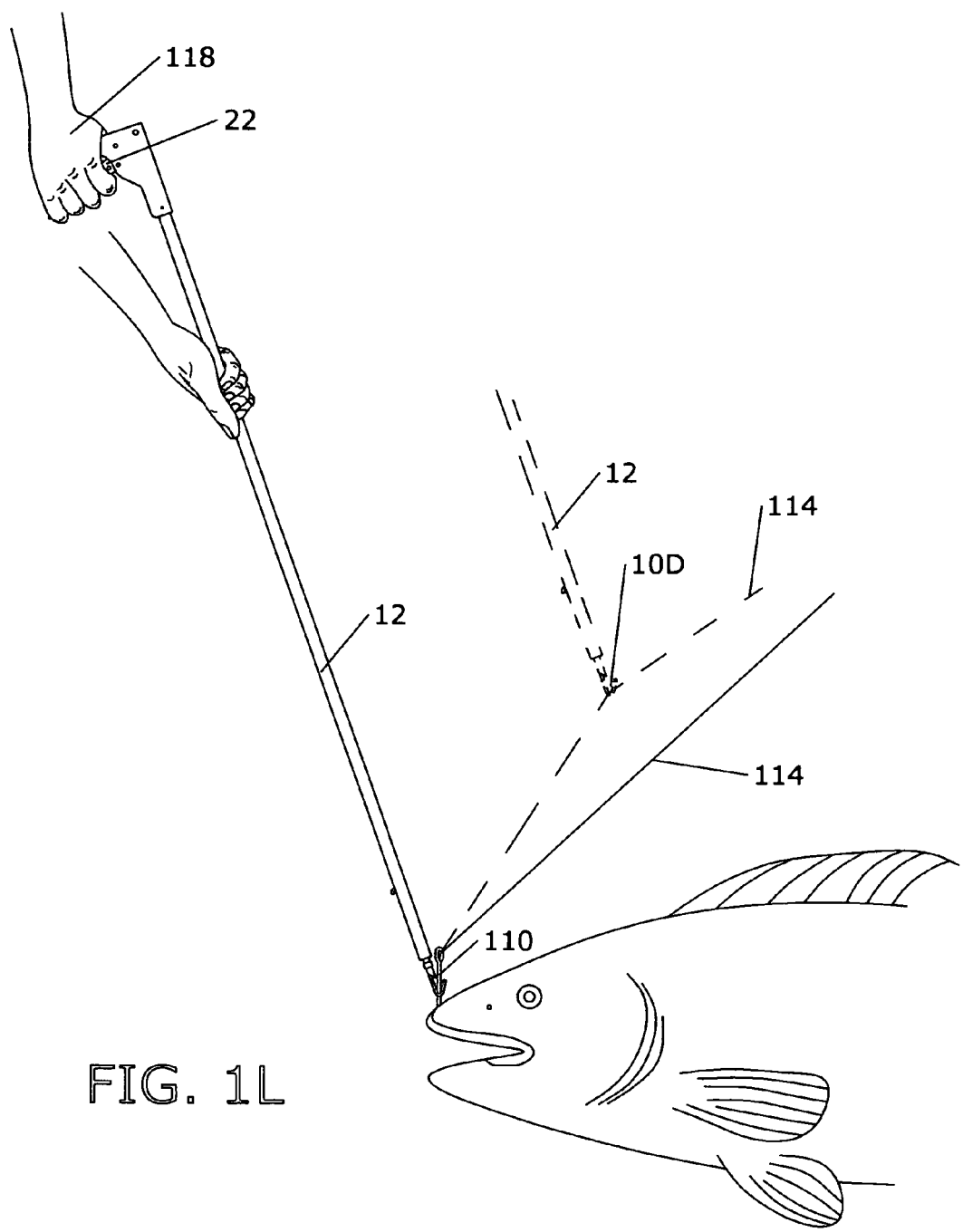
Figure 1M:
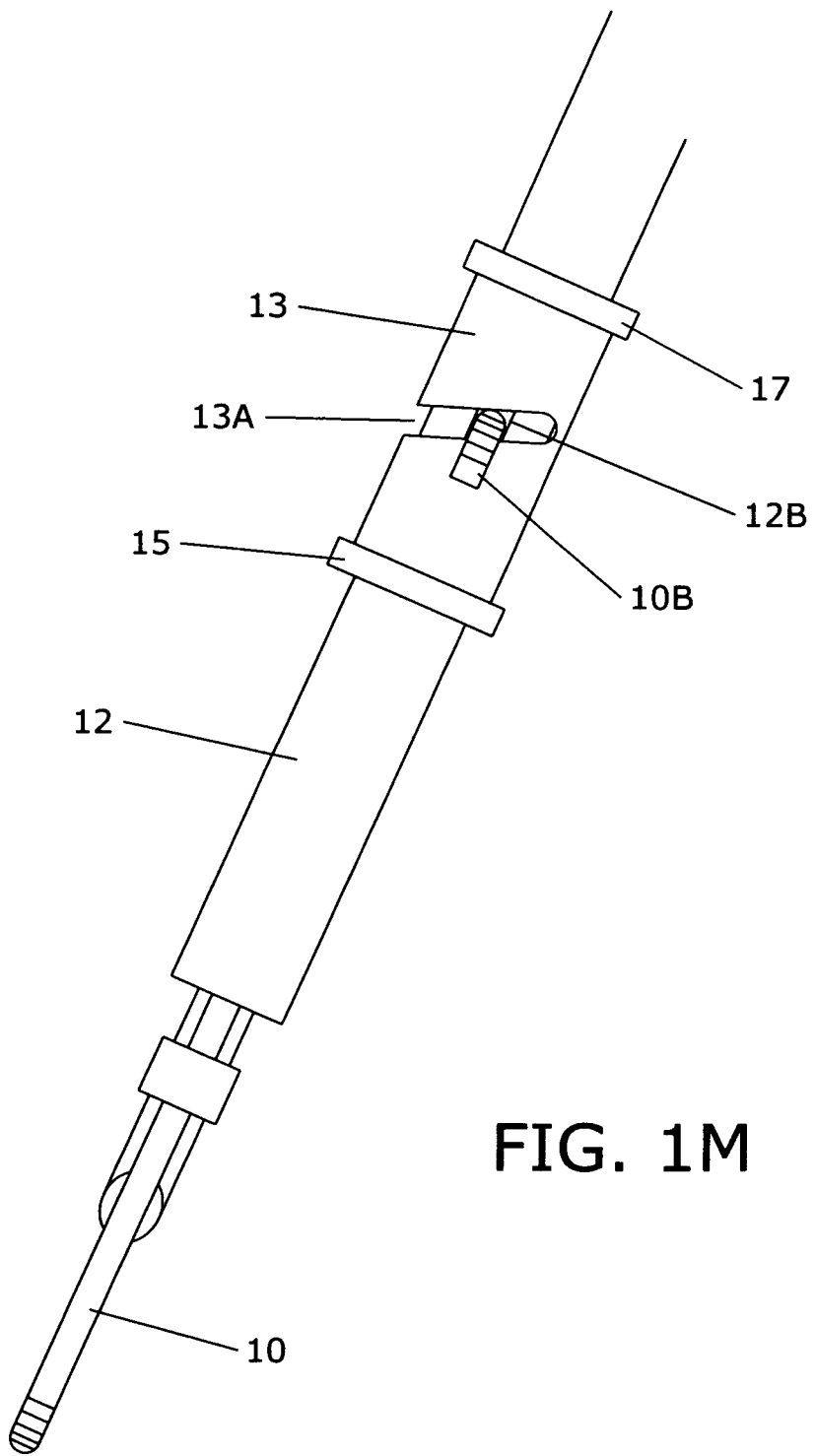
Figure 2A:
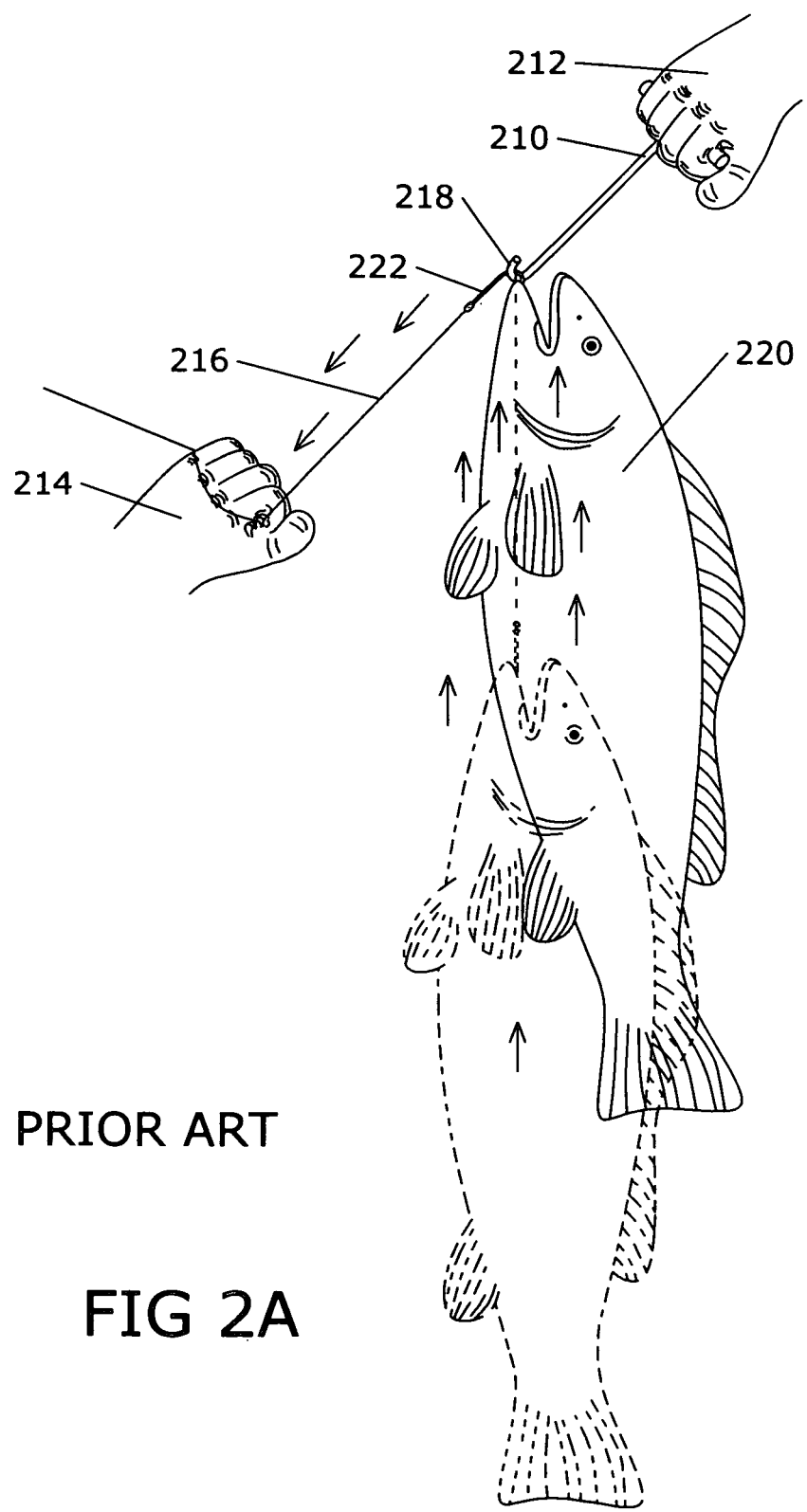
Figure 2B:
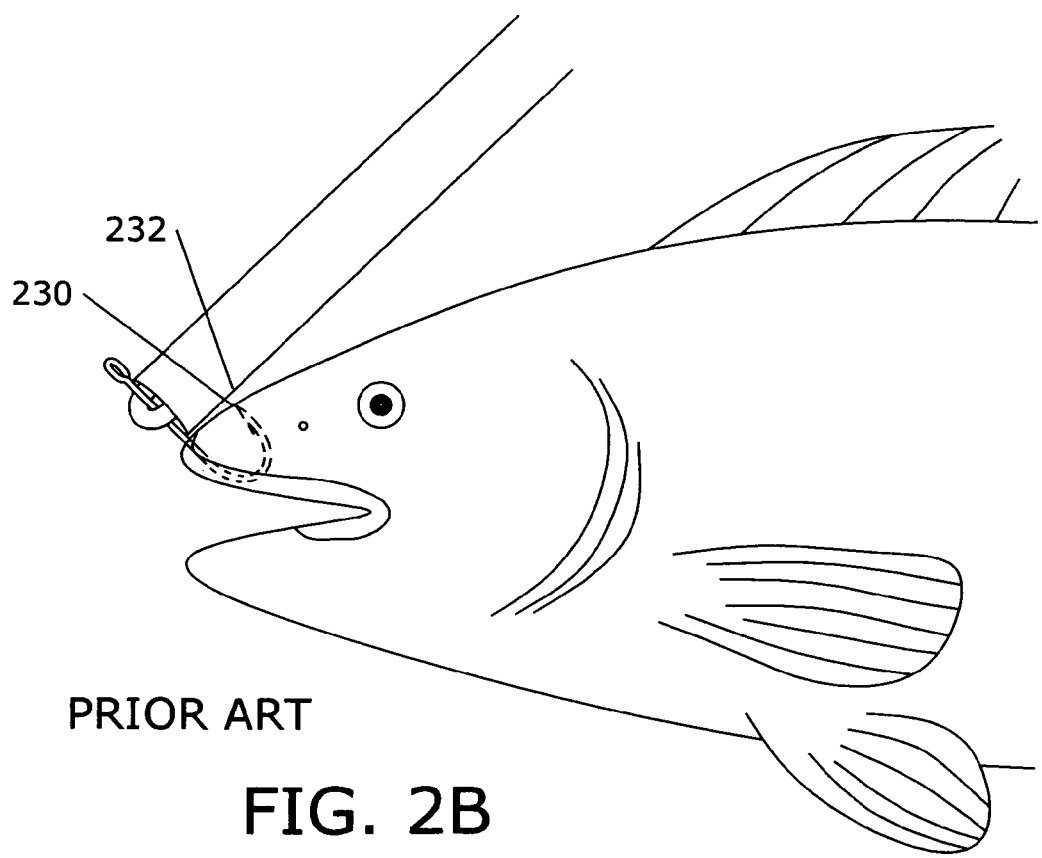
Figure 3A:
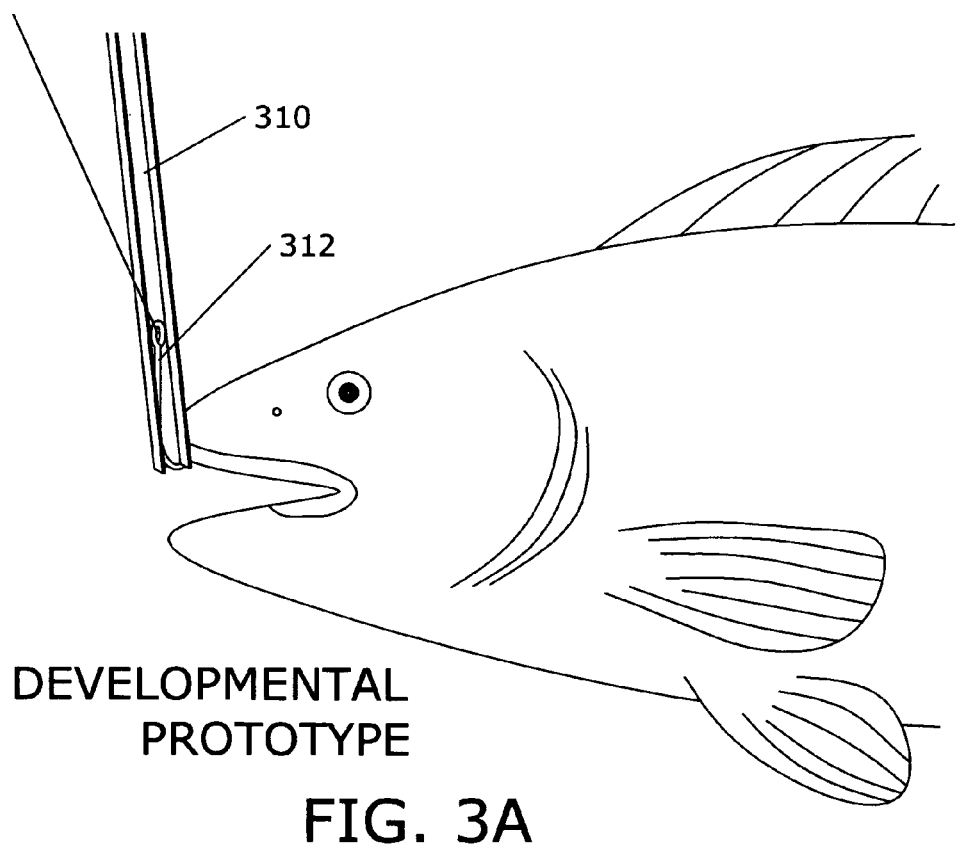
Figure 3B:
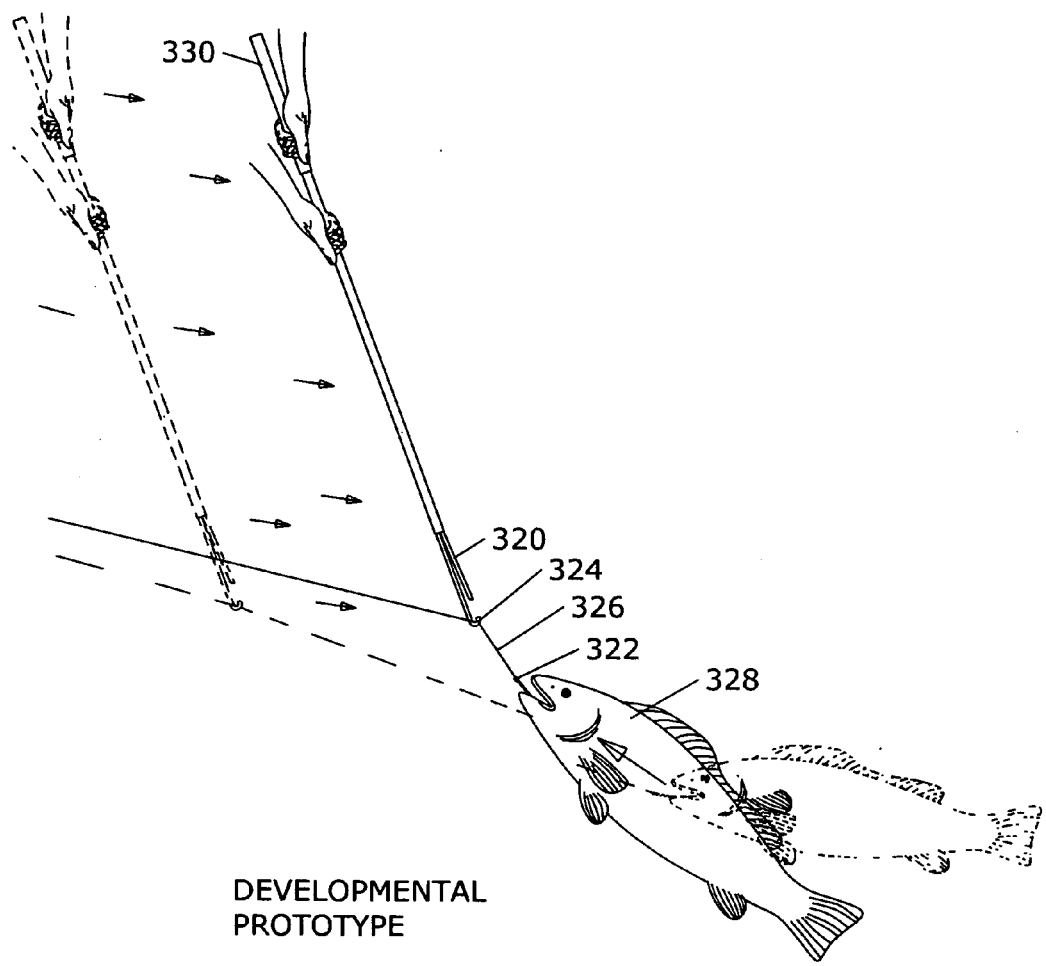
Figures 3C, 3D:
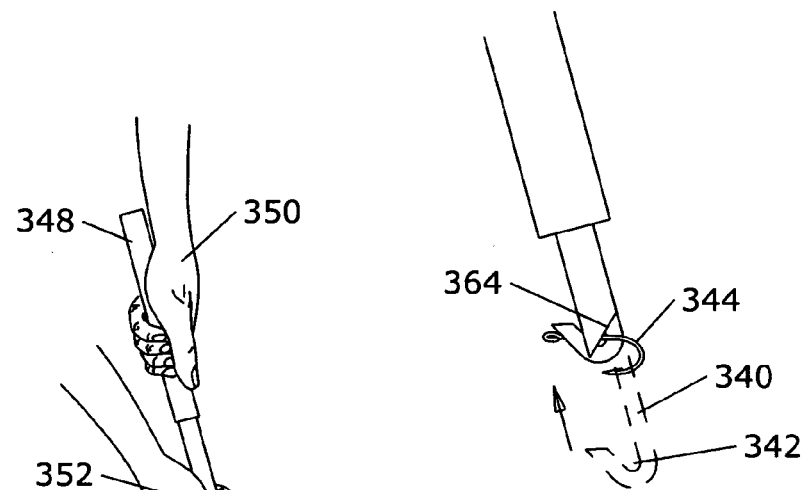
Figure 3E:
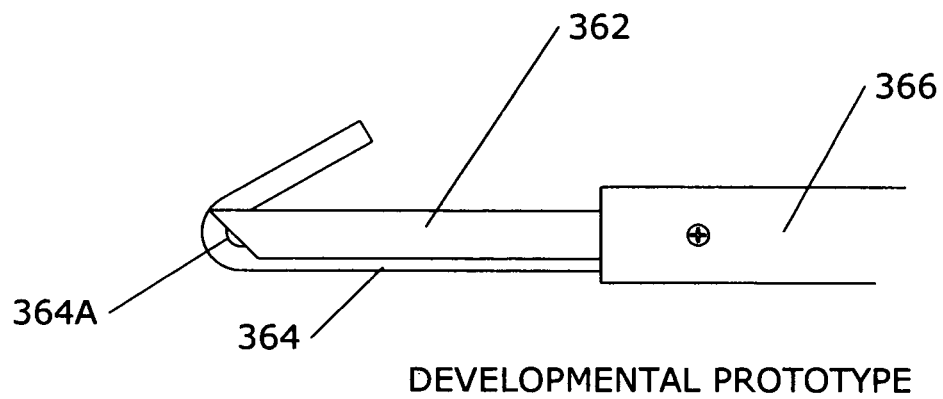
Figure 3F:
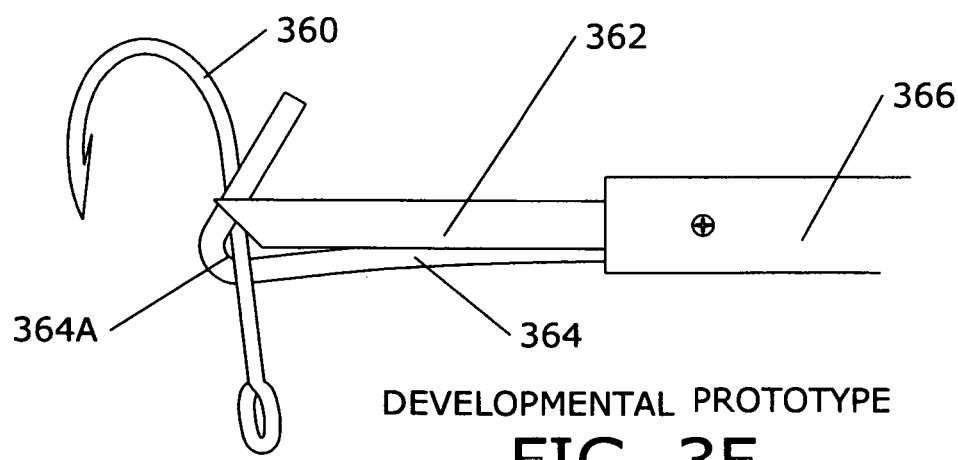

| | | | |
|---|---|---|---|
| 2,947,106 A * | 8/1960 | Lewan | 43/53.5 |
| RE24,902 E * | 12/1960 | Dillard | 43/53.5 |
| 3,001,320 A * | 9/1961 | Sonner, Jr. | 43/53.5 |
| 3,011,286 A * | 12/1961 | Wallace | 43/53.5 |
| 3,132,438 A * | 5/1964 | Ward et al. | 43/53.5 |
| 3,374,022 A * | 3/1968 | Tagg | 294/103.1 |
| 3,419,924 A * | 1/1969 | Archibald | 43/53.5 |
| 3,451,157 A * | 6/1969 | Jones | 43/53.5 |
| 3,514,892 A * | 6/1970 | Wormsbecker | 43/53.5 |
| 3,721,034 A * | 3/1973 | Collins | 43/53.5 |
| 3,869,822 A * | 3/1975 | Tieman | 43/53.5 |
| 3,918,757 A * | 11/1975 | Huber | 294/103.1 |
| 4,014,131 A * | 3/1977 | Bendik | 43/53.5 |
| 4,127,957 A * | 12/1978 | Bourquin et al. | 43/53.5 |
| 4,342,171 A * | 8/1982 | Cripps et al. | 43/53.5 |
| 4,389,770 A * | 6/1983 | Bocinski et al. | 29/764 |
| 4,833,817 A * | 5/1989 | Silverthorn | 43/53.5 |
| 5,201,139 A * | 4/1993 | Middleton | 43/53.5 |
| 5,307,586 A * | 5/1994 | Palmer | 43/53.5 |
| 5,644,865 A * | 7/1997 | Harrison et al. | 43/53.5 |
| 5,784,830 A * | 7/1998 | Brumfield | 43/53.5 |
| 5,921,016 A * | 7/1999 | Shelton | 43/53.5 |
| 5,983,555 A * | 11/1999 | Biel | 43/53.5 |
| 6,240,673 B1 * | 6/2001 | Shelton | 43/53.5 |
| 6,688,034 B1 * | 2/2004 | Mantel | 43/53.5 |
| 6,766,609 B1 * | 7/2004 | Aboczky | 43/53.5 |
| 2003/0029075 A1 * | 2/2003 | Hebard | 43/53.5 |
| 2008/0005955 A1 * | 1/2008 | Larcher | 43/53.5 |
| 2008/0313950 A1 * | 12/2008 | Larcher | 43/53.5 |
| 2011/0072707 A1 * | 3/2011 | Shepherd | 43/53.5 |

FOREIGN PATENT DOCUMENTS

| | | | | |
|---|---|---|---|---|
| JP | 11318304 A * | 11/1999 | | A01K 97/18 |
| JP | 2000041559 A * | 2/2000 | | A01K 97/18 |
| JP | 2001045944 A * | 2/2001 | | A01K 97/18 |
| JP | 2001169706 A * | 6/2001 | | A01K 97/18 |
| JP | 2002125555 A * | 5/2002 | | A01K 97/18 |
| JP | 2002199833 A * | 7/2002 | | A01K 97/18 |
| JP | 2002320435 A * | 11/2002 | | A01K 97/18 |
| JP | 2004248647 A * | 9/2004 | | A01K 97/18 |
| JP | 2005185185 A * | 7/2005 | | A01K 97/18 |
| JP | 2005253375 A * | 9/2005 | | A01K 97/18 |
| JP | 2008073036 A * | 4/2008 | | A01K 97/18 |
| JP | 2009261316 A * | 11/2009 | | A01K 97/18 |
| WO | WO 2005110078 A1 * | 11/2005 | | A01K 97/18 |
| WO | WO 2007051442 A1 * | 5/2007 | | A01K 97/18 |
| WO | WO 2009148332 A1 * | 12/2009 | | A01K 97/18 |

* cited by examiner

DEVELOPMENTAL
PROTOTYPE

DEVELOPMENTAL
PROTOTYPE

DEVELOPMENTAL PROTOTYPE

DEVELOPMENTAL PROTOTYPE

FISHING HOOK REMOVER AND FISH RELEASER

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to removing fishing hooks from fish, specifically to such hook removers used from a boat while the fish is in the water.

2. Prior Art

Many anglers have been hooked, bitten, cut and punctured trying to remove fishing hooks from fish. This process is even more dangerous when one leans over the gunwale and tries to remove a hook or hooks from a fish in the water. The process would be safer for both angler and fish if the de-hookers were longer. A heightened sense of safety would make it more likely the angler would remove the hook or hooks from the fish and doing so while the fish is in the water. A greater working distance allows the angler to be less cautious thus reducing release time. The shortened release time would reduce stress for both angler and fish. Leaving the fish in water would eliminate three major concerns: additional stress, removal of protective slime and damage to vital organs.

Most commercially successful fishing hook removers can be viewed on web sites such as Boaters World, West Marine or Bass Pro Shop.

There are two types of de-hookers and they work on different principles. FIG. (2A) shows prior art, a line tension de-hooker. Some examples are U.S. Pat. No. 4,127,957 to Bourquin (1978), U.S. Pat. No. 6,397,513 to Reed (2002) and the ARC Dehooker. An angler pulls on the fishing line to position the hook and maintains tension to keep the hook correctly positioned until the hook is removed. The second type of de-hooker is the grip type. Pliers are a good example of a grip type de-hooker. Grip de-hookers have moving part or parts, which come together to secure the fishing hook. After the fishing hook is secured the fishing hook is pulled and or twisted out.

Standard de-hookers are not designed to release fish from a boat without removing them from the water, as evidence their short length. If an angler does use a short de-hooker they must lean over the gunwale to reach the fish.

The three most frequent problems de-hookers suffer are (1) inadequate leverage to hold a fishing hook secure enough to dislodge said hook, (2) the way the hook is gripped often makes it more difficult to remove and (3) having to use line tension to position the fishing hook and maintaining tension through the removal process.

Grip type hook removers with a 3 to 1 mechanical advantage seem to work ok. However the better the mechanical advantage the better they work. Hooks are designed not to come out easily as evidence their barbs. A strong grip is needed for the fishing hook not to slip when the fishing hook is being pulled and or twisted out.

Many grip de-hookers limit the size of hooks they can successfully remove. FIG. (2B) showing prior art, the end of a poorly designed hook remover or a de-hooker too large for the fishing hook it is to remove. The gap between the fishing hook point (230) and the de-hooker (232) is too small for the flesh and tissue to go through without being torn or the fishing hook straightened. I refer to this situation as "hook locking". If the de-hooker uses a smaller object to grip the fishing hook, "hook locking" is minimized.

If a de-hooker uses a smaller object to grip the fishing hook a greater mechanical advantage is needed. The fishing hook acts as a lever. The de-hooker with a small gripper limits how far from the fulcrum the force can be applied to grip the fishing hook. This gives the fishing hook a mechanical advantage making it harder to keep the gripper closed. To better explain this, find a level surface such as a table and place an elongated object such as a pencil on the very edge of a square corner. Have both ends of the pencil hanging over the edges equal amounts. Place a finger on top of the pencil securing the pencil against the flat surface. With the other hand grab the end of the pencil and see how easy it is to rock the pencil up and down even though you are pressing down with your finger to keep the pencil from rocking. Now move the pencil an inch or two in from the corner and repeat the process described above. It is harder to rock the pencil because the finger holding the pencil is farther from the edge or the fulcrum. If a de-hooker has a small gripper it is able to grip smaller fishing hooks without "hook locking". But it needs a better mechanical advantage to stay shut.

Line tension de-hookers work extremely well if the fishing line is strong compared to the hook size and fishes weight. FIG. (2A) shows a prior art hook remover, of this type. The angler grabs the de-hooker (210) in one hand (212) and the fishing line (216) in the other hand (214). Looping the fishing line (216) around the hand (214) makes it easier to apply the tension necessary to position the fishing hook (222) and hold it in the correct position until hook (222) is removed. Once the loop is made the angler grabs the fishing line (216) with the J end (218) of the de-hooker (210). Spreading ones arms creates line tension. Line tension positions the fish (220) and fishing hook (222) so hook (222) can be removed. The angler has his hand (212) above hand (214). By putting hand (214) below hand (212) hook (222) and fish (220) in a favorable position for hook (222) removal. Fish (220) at this point may come unhooked. If fish (220) does not come unhooked one must drop both arms at the same time and jerk up to create more force. This action is repeated until the fish comes unhooked.

The only de-hooker designed to release fish in the water from a boat is made by Aquatic Releaser Conservation ARC Dehooker. This product can be viewed at www.dehooker-4arc.com/.

ARC Dehooker suffers from a number of disadvantages:
(a) The de-hooker has a loop on one end, which makes over a complete circle. There is a gap between the over lapping portion of the loop for the fishing line to go through.
(b) Once the fishing line is through the gap it is encircled. The angler then guides the hook remover to the fishing hook. If there is a lot of line tension it will be easy to guide the Dehooker. If the fishing line is a low pound test the line may break before enough line tension can be applied to guide the de-hooker.
(c) Once the de-hooker is in the correct position with fishing hook shank encircled the angler grabs the fishing line and pulls to create line tension. Line tension correctly positions the hook so it can be removed. The angler maintaining tension pushes the de-hooker forward to remove the hook. It takes a lot of line tension to position the fishing hook so it can be removed and if the fishing line is weak it will break.

(d) A hook can be difficult to remove from smaller fish especially if the hook is well imbedded or the fishing hook is large compared to the fish. Fish in water have a near zero buoyancy, as they neither float well nor sink fast. If the fish is not swimming it can easily be moved in any direction. So when an angler pushes to remove the hook, chances are the water does not provide enough counter force to hold the fish and it simply moves along with the de-hooker, leaving the fishing hook in place.

(e) If a lure is used or tackle with multiple hooks it will be hard or impossible to encircle the fishing hook inside the hoop. A lure larger than the circle would prevent the Dehooker from reaching the fishing hook. Multiple hooks would be hard to maneuver around. It would be difficult but the angler could encircle the fishing line after the last fishing hook not imbedded.

(f) FIG. (2A) shows prior art, a line tension de-hooker positioning the fishing hook in a favorable position for removal. It will be hard, because of the Dehooker's longer length, to rotate the fishing line to better position the fishing hook especially with the longer models unless two or more persons worked as a team.

DEVELOPMENTAL PROTOTYPES

When I started developing a de-hooker with sufficient length to release fish from a boat without removing the fish from the waters, ARC Dehooker was not on the market and I have never used one.

The disadvantages I stated above were based on my own experimentation necessary for the development of my de-hooker and the fact that the ARC dehooker uses line tension to position the hook and keep it in place until the hook is removed. This process I am very familiar with. I made a de-hooker which used a pushing motion to remove fishing hooks. To avoid using line tension a three-sided piece of aluminum with outside dimensions of 0.50"×0.40"×0.50" and 36¼" long was used. The line and hook shank go in the open side and the bend in the fishing hook would rest against the bottom of one of the two sides next to the opening. The sides were close enough together to hold the fishing hook in a favorable position for removal. FIG. (3A) shows the end of the prototype de-hooker (310) with a fishing hook (312) in it. The land test went great. I inserted various types and size hooks into different objects including the sole of my shoes. The hooks came out easily. At this point I felt with a little refinement to the hook-receiving end and a more visually pleasing de-hooker, I had something. The water test did not go well. The water did not provide enough resistance to hold the fish secure enough for the hook to be dislodged. After going from a pushing motion to a jabbing motion with inconsistent success, I realized this approach was not practical. The de-hooker was limited in the situations in which it would work well.

When talking about a fish releaser and hook remover with sufficient length making it safe and easy to remove a fishing hook from a fish while it is in the water and the angler is in a boat, a new term must be defined: "control" in terms of hook removal means: the ease in which an angler is able to position the de-hooker and secure the fishing hook for removal. Control is lost because of the additional length needed by such a de-hooker. Leaving the fish in the water where its movement is less restrained than it would be in ones hands or on a deck increases the necessity for greater control.

FIG. (3B) shows a prototype in the open position. The lower end has a long pair of jaws (320) which both move to trap the fishing hook (322). One of the jaws (320) has a hook (324). The hook (324) uses the fishing line (326) to create tension to position the fish (328) and this makes it easier to grab the fishing hook (322) with the jaws (320). The other end has a handle (330) which when pulled closes the jaws (320).

Only disadvantages concerning "control" will be addressed. The jaws obstruct the view making it harder to see if the fishing hook was correctly positioned. The other problem being in order to position the de-hooker the angler lowers it down. If the fish is hit and there is not a lot of line tension holding the fish up, the fish will be pushed down. Also when the fishing hook is positioned between the jaws the angler needs a slight downward force to keep the fishing hook in place until the jaws can secure the fishing hook. This also pushes the fish down. The fish moving farther away and deeper are both problems especially when the water visibility is poor.

It would be better if the de-hooker worked from the bottom up. That way the fish is pulled to the surface and closer to the angler rather than pushed down and farther away. When the fish surfaces gravity provides a natural counter force making it easier to position the de-hooker.

Often when an angler attempts to remove a fishing hook the line is not straight up and down, it is at an angle. Imagine a sphere with the center at the tip of the fishing rod. The length of fishing line from the tip of the fishing rod to the fishing hook determines the size of the sphere. The portion of the sphere in the water forms a bowl and the fishing hook will be some where in the bowl. It is better for the fish to be pulled to the near side of the bowl by the failed attempts to secure the fishing hook rather than being pushed to the far side by the failed attempts.

FIGS. (3C and 3D) shows a prototype. FIG. (3C) shows one end of the de-hooker with a fishing hook secured. FIG. (3D) shows the whole de-hooker in the open position. To explain the disadvantages of this prototype it will be easier if some of the parts are named and their function explained. The disadvantages will only address those relevant to "control". The list of relevant parts is as follows:

a) FIG. (3C): J (340) is a moving part and has a hook (342) on one end. The J (340) has two functions. First to be able to use line tension to position the de-hooker. Second to secure fishing hook (344) for removal.

b) FIG. (3C): Fixed trapping surface (346) is a stationary part and is what J (340) secures the fishing hook against for removal.

c) FIG. (3D): Handle (348) when pulled moves J (340) to secure a fishing hook against fixed trapping surface (346).

FIG. (3D): The disadvantages are, in order to secure fishing hook (344) handle (348) has to be pulled, this requires gripping handle (348) and using arm (350) to pull it back. Control is lost because of arm (350) movement and other arm (352) trying to hold the de-hooker stationary has to counteract the force applied to secure the fishing hook by other arm (350).

FIG. (3C) shows another problem. J (340) moves upward. After fishing hook (344) is positioned in hook (342), the angler must lower the de-hooker as it closes to keep the fishing hook position. This problem would be eliminated if J (340) was stationary and the fixed trapping surface (346) moved down to the J (340). There is another advantage of doing this. The angler will position the de-hooker by pulling up instead of pushing down. This will bring the fish closer to the angler rather than farther away and deeper. When the fish reaches the surface gravity will prevent further upward movement making it easier to position the fishing hook.

FIGS. (3E) and (3F) shows the fish hook securing end of a prototype de-hooker. FIG. (3E) shows the end of the de-hooker in the closed position. FIG. (3F) shows the de-hooker in the closed position with a large fishing hook (360) secured. Shaft (362) extends to push the fishing hook (360) against V (364A). The fishing hook (360) would be more secure if jay (364) would not flex. As evidence a gap between shaft (362) and jay (364) and in FIG. (3E) there is no gap. Another problem is the prototype shaft (362) exerts so much force that V (364A) is straightened.

OBJECTS AND ADVANTAGES

Accordingly, besides the objects and advantages of a fish releaser and hook remover with sufficient length to make it safe and easy to remove fishing hooks from fish while they are in the water and the anglers in a boat. Other objects and advantages are:
- (a) To provide a de-hooker that can use line tension to position the fish and de-hooker but does not use said line tension for hook removal.
- (b) To provide an elongated de-hooker which has as much "control" as possible.
- (c) To provide a de-hooker which works well if there is not enough line tension to guide the de-hooker or pull the fish into position.
- (d) To provide a de-hooker with a specific point to position the fishing hook so it can be secured.
- (e) To provide a de-hooker with a specific point to position the fishing hook and this point is easily determined and its shape makes it easy to position the fishing hook at the specific point.
- (f) To provide a de-hooker with a specific point to position the fishing hook which remains constantly position relative to the body of the de-hooker.
- (g) To provide a de-hooker with an unobstructed view to the specific point were the hook is secured.
- (h) To provide a de-hooker which is usually positioned by pulling the de-hooker inward rather than pushing the de-hooker outward.
- (i) To provide a grip de-hooker with a small object to secure the fishing hook.
- (j) To provide a de-hooker with a superior mechanical advantage.
- (k) To provide a de-hooker with a mechanical advantage that increases as it nears the point were the fishing hook is secured.
- (l) To provide a de-hooker which does not require arm movement to secure the fishing hook.
- (m) To provide a de-hooker with a trigger, when pulled, secures the fishing hook.
- (n) To provide a de-hooker with a trigger when fully depressed requires only enough force to keep the trigger spring depressed.
- (o) To provide a de-hooker which can easily be manufactured in different lengths.

Still further objects and advantages will become apparent from a consideration of the ensuing description and drawings.

SUMMARY

The present invention, an elongated de-hooker with a V shaped hook fixed on one end and a handle and trigger on the other end. The trigger when pulled extends a rod that pushes a fishing hook against the V shape hook. The rod's mechanical advantage increases as the rod nears the fixed V shape hook.

Generally, the fishhook remover of the present invention is comprised of an elongated shaft that has a proximal end adjacent the user when in use and an opposite distal end positionable adjacent a fish in the water from which a hook is to be removed. A fishhook engaging hook, as distinct from a fishhook, is mounted at the shaft distal end for hooking around the fishhook shaft. The remover also includes a retractable clamp that can be extended to clamp a fishhook between said clamp distal end and the hook. An actuator is also included at the proximal end of the shaft to move the clamp from the retracted position to its extended position.

More specifically, as will be illustrated in the preferred embodiment, the fishhook remover is comprised of an elongated tubular shaft having a proximal end, an attachment opening, and a distal end. A jay spring extends into the distal end of the shaft with a V-shaped hook projecting from the distal end of the shaft. The jay spring further includes an attachment hook at its proximal end extending into the tubular shaft attachment opening, and an intermediate coil.

An elongated clamping rod is slidable within the shaft and the jay spring coil between a retracted position and an extended position. The clamping rod includes a distal end having a forked hook engaging end extending from the distal end of said shaft to clamp a fishhook between the forked end and the hook when the clamping rod is in an extended position.

The hand gripped actuator preferably includes a handle attached to the proximal end of the tubular shaft, and a trigger pivotally attached to the handle, e.g., by a pivot pin. The trigger including a handgrip extending downwardly from the pivot pin, and a toggle connection arm with a guide pin extending upwardly from the pivot pin.

The trigger operates a toggle linkage to act as a force multiplier to securely hold the end of the clamping rod against the hook. The toggle linkage is comprised of a first toggle link having a distal end pivotally attached to the proximal end of the clamping rod and a proximal end, and a second toggle link having a distal end pivotally attached to the first toggle link proximal end, a longitudinal slot to slidably receive the guide pin, and a proximal end pivotally attached to the handle. Movement of the trigger to its retracted position, toggles the links from angular alignment to longitudinal alignment with the longitudinal axis of the clamping rod.

DRAWINGS

In the drawings, figures related by the de-hooker of the present invention are numbered 1, prior art are numbered 2 and prototypes used to develop the de-hooker of the present invention are numbered 3. Alphabetic suffixes subdivide the three groups stated above. Details of individual parts have the same number as the part but different alphabetic suffixes.

FIG. (1A) shows an exploded view of the de-hooker of the present invention.

FIG. (1B) shows greater detail of the back end of shaft (14), front link (16) and back, link (18)

FIGS. (1C and 1D) shows greater detail of the front end of shaft (14)

FIG. (1E) shows the front end of the de-hooker in the closed position.

FIG. (1F) shows the front end of the de-hooker in the open position.

FIG. (1G) shows a cross section view of the front end of the de-hooker.

FIG. (1H) shows the handle end with the trigger in fully extended or open position.

FIG. (1I) shows the handle end with the trigger in the fully depressed or closed position.

FIG. (1J) shows a longitudinal cross section view of the front end of the de-hooker.

FIG. (1K) shows the front end of the de-hooker with a fishing hook secured.

FIG. (1L) shows the de-hooker of the present invention in use.

FIG. (1M) shows a way for jay (10) to be adjusted.

FIG. (2A) shows prior art, a line tension de-hooker removing a fishing hook.

FIG. (2B) shows prior art hook locking, with one end of a grip de-hooker holding a fishing hook.

FIG. (3A) shows the end of a three sided prototype de-hooker with a fishing hook in it.

FIG. (3B) shows a long jaws prototype de-hooker in use.

FIG. (3C) shows one end of a prototype de-hooker.

FIG. (3D) shows the entire prototype de-hooker shown in FIG. (3C).

FIG. (3E) shows the end of a prototype de-hooker in the closed position.

FIG. (3F) shows the same prototype de-hooker as FIG. (3E) with a hook secured.

DRAWINGS

Reference numbers for all the parts of the de-hooker of the present invention.
10) jay spring
12) body
14) shaft
16) front link
18) back link
20) handle
22) trigger
24) trigger spring
26) front spacer
28) back spacer
30) top plate
32) 2 screws
34) 2 screws
36) bolt
38) nut
40) ring
42) grommet
44) rivet
46) rivet
48) rivet
50) rivet
52) rivet
54) rivet
56) rivets

DETAILED DESCRIPTION

FIG. (1A)—Preferred Embodiment

The preferred embodiment of the de-hooker of the present invention is illustrated in FIG. 1A (isometric exploded view) and shows all the parts making up the de-hooker. Fig starting with the number 1 and an alphabetic suffixes other then A will show one or more parts in further detail. In FIG. (1A) the terms front, back, top, bottom and side will be used in descriptions and the parts orientation will remain consistent in the rest of the patent. The front of an object is the portion closest to the top left corner, back is closest to the lower right corner, top is closest to the top right corner and bottom is closest to lower left corner. The side is in full view or the +Z axes and sides refer to the full view side and hidden side or the +Z and −Z-axes.

Preferred materials for the parts illustrated in FIG. (1A). Jay spring (10) is stainless steel spring wire. Shaft (14) is a hardened stainless steel rod. Body (12) is an aluminum tube. Front spacer (26) is a stainless steel cylinder. Front link (16) is a rectangular bar of stainless steel. Back link (18) is a rectangular bar of stainless steel. Back spacer (28) is a stainless steel cylinder. Handle (20) is stainless steel sheet metal. Trigger (22) is stainless steel sheet metal. Trigger spring (24) is a stainless steel torsion spring. Top plate (30) is stainless steel sheet metal. Screws (32) and (34) are stainless steel. Rivets (44), (46), (48), (50), (52) and (54) (56) are stainless steel. Bolt (36) and nut (38) are stainless steel. Ring (40) is stainless steel. Grommet (42) is rubber.

Preferred connections and interactions for the parts illustrated in FIG. (1A). Jay (10) has a small bend down (10B) and is inserted into bottom body hole (12B). Grommet (42) when placed in hole (12B) will keep jay (10) from moving backwards. Placement of shaft (14) will prevent removal of jay (10). Front spacer (26) has a bottom slot (26C) running the full length. Jay (10) slips into slot (26C) and spacer (26) is then slip fit into body (12). The two threaded holes (26A) on opposite sides of spacer (26) are lined up with the two holes (12A) on opposite sides of body (12). Screws (32) are inserted in the opposing holes. First through holes (12A) and then into treaded holes (26A). Back spacer (28) and front of handle (20) are attached to body (12) by lining up respective holes and inserting screws (34) in from opposing sides. The screws pass through handle hole (20B) first, body hole (12C) second and into treaded hole (28A). The back of handle (20) and back link (18) are attached to body (12) by lining up handle hole (20C), body hole (12D) and pivot hole (18B). Bolt (36) is inserted first through handle hole (20C), second body hole (12D), third pivotal hole (18B), fourth the opposing body hole (12D), and fifth the opposing handle hole (20C). Nut (38) secures bolt (36). Front link (16) is attached to back link (18) by passing rivet (46) first through pivot hole (16B), second pivot hole (18A) and third the opposing pivot hole (16B). Shaft (14) is attached to front link (16) by inserting rivet (44) first through pivot hole (16A), second shaft hole (14A) and third opposing pivot hole (16A). Shaft (14) is able to slide and is positioned in the center of body (12) by front spacer hole (26B) and back spacer hole (28B). Trigger (22) is attached to handle (20) by inserting rivet (52) first through handle hole (20A), second trigger pivot hole (22B), third opposing trigger pivot hole (22B) and forth opposing handle hole (20A). Trigger spring (24) is held in place by inserting rivet (50) first through trigger hole (22C), second the center of the trigger spring (24) and third the opposing trigger hole (22C). Top plate (30) is attached to body (12) by rivets (56). One of the two rivets (56) passes through top plate hole (30A) first and body hole (12G) second and the second rivet (56) passes through top plate hole (30B) first and body hole (12F) second. Trigger (22) is attached to back link (18) by passing rivet (48) first through trigger hole (22A), second back link slot (18C) and third the opposing trigger hole (22A). Shaft (14) has a shallow slot (14B). Ring (40) encircles shaft (14) and positioned over slot (14B). Ring (40) is then bent into slot (14B) to hold it on shaft (14).

Some of the parts must be assembled in a certain order. First the back spacer (28) should be slid into its position inside body (12) and temporarily secured. Second shaft (14), front link (16) and back link (18) should be assembled and inserted in the back end of body (12) and into cylinder hole (28B). When the back end of shaft (14) reaches the back end of spacer (28) links (16) and (18) are pulled through body slot hole (12E) and trigger (22) is attached to link (18) by rivet (48). Third the handle (20) can be attached at this point without causing assembly problems.

Additional details of the present invention are shown in FIGS. (1A, 1B, 1C, 1D, 1E, 1F and 1G). FIG. (1B) shows a top or bottom view of link (18), link (16) and the back end of shaft (14). Shaft (14) is notched (14C) equally on both sides. The remaining shaft end (14B) is half the thickness of link (16) and link (18). Link (16) is center notched (16D) and (16E) on both ends. The width of the notches (16D) and (16E) is half the thickness of link (16) and (18). The corner which remains (16C) after link (16) is center notched on both ends is one forth the thickness of link (16) and (18). All four of link (16) corners are the same. Link (18) is notch equally on both side and the remaining link end (18D) is half the thickness of link (16) and (18). The ends slip fit together and all notches are deep enough to allow the parts to pivot.

FIG. (1A) shows jay spring (10) and it has a V (10D) on the front end and a loop (10B) on the back end. In the middle there is a small bend (10C) and coils (10E). The trapping point (10A) is the portion of the V (10D) in which a fishing hook is secured. Bend (10C) fits in front spacer (26) bottom slot (26C) and bend (10C) is near the longitudinal center of bottom slot (26C). FIG. (1C) is a bottom view of shaft (14). Jay slot (14E) length is greater then the distance from jay (10) trapping point (10A) to the back end of bend (10C). A portion of jay (10) between trapping point (10A) and bend (10C) fits into slot (14E). Slot (14E) width and depth allow shaft (14) to slide. The front end of shaft (14) is cut on an angle and this flat angled surface is the trapper surface (14G). The trapper surface (14G) pushes a fishing hook against the trapping point (10A). FIG. (1C) the bottom view and (1D) a top view of the front end of shaft (14) and both show notch (14F). Jay (10) is in notch (14F) when shaft (14) is fully extended.

FIGS. (1E), (1F) and (1G) show the front end of the de-hooker. FIG. (1E) shows the de-hooker in the closed position and why notch (14F) is needed. If notch (14F) were not on top of shaft (14) the distance between the trapping point (10A) and trapper surface (14G) would be too large to secure small hooks. FIG. (1F) shows the de-hooker in the open position. FIG. (1G) shows a cross section of the front end of the de-hooker. The front spacer slot (26C) is better illustrated in view (1G). Spacer (26) could not be installed without slot (26C) because of jay (10).

Operation—FIGS. (1H, 1I, 1J, 1K and 1L)

To understand the operations of the de-hooker of the present invention one must first understand why the de-hooker has such a superior mechanical advantage in its ability to grip a fishing hook. Imagine a 200 lb ball attached to top of a three feet rod. If the rod and ball are straight up and down or at their highest point, the apex, no force is needed to hold the rod and ball up. Now lets lean the ball and rod approximately 5.7 degrees. At this angle it will take about 20 lbs of force to keep the ball and rod stationary. If one wants to raise the ball back to its apex a force greater then 20 lbs will be needed at the start and as the ball nears the apex the force needed will be less and less. If the rod extends to the center of gravity of the ball and the ball is removed. The rod is then placed back in the same position as it was when, 20 lbs of force was needed to hold the ball and rod stationary. The rod is then moved back to the apex along the same path as before. Even though the resistance force of 200 lbs is not there the rod still has the ability to lift the 200 lbs with the same amount of effort as when the ball was attached.

FIGS. (1H) and (1I) illustrates the handle end of the de-hooker. All the parts necessary to illustrate the de-hookers superior mechanical advantage have solid lines. Nonessential parts have broken lines and not all parts are shown.

FIG. (1H) shows the de-hooker in the open position. As trigger (22) is squeezed it rotates around rivet (52). As trigger (22) rotates, rivet (48) pushes link (18) upward and this in turn pulls link (16) upward and this in turn pushes shaft (14) out.

FIG. (1I) shows the trigger fully depressed. Shaft (14), link (16) and link (18) are in a straight line. Rivet (48) is at its apex. At this point the only force needed to keep a fishing hook secured is the force necessary to keep spring (24), not shown, from pushing the trigger (22) back out.

Some mechanical advantage is gained because the distance between rivet (52) and rivet (48) is less than the distance between rivet (52) and the end of the trigger (22D). This is a lever system with trigger (22) being the lever and rivet (52) the fulcrum. Other de-hookers that have a mechanical advantage use a lever system to gain the mechanical advantage.

FIG. (1H) shows the de-hooker in the open position. Rivet (48) will rotate approximately 45 degrees from its currant position to reach its apex. Shaft (14) will move much faster at the beginning of rivet (48) rotation. There are three reasons. First when rivet (48) starts rotating there is more upward movement and as rivet (48) nears its apex the upward motion is decreasing and the sideway motion is increasing. Second rivet (48) is at its closest point to bolt (36) and this is link (18) fixed pivot point. Movement caused by rivet (48) is maximized at this point, because rivet (48) is at it's closes point to link (18) pivot point. Third there is approximately a 90-degree angle between link (16) and link (18) when trigger (22) is fully out. As trigger (22) is squeezed rivet (48) starts rotating causing link (16) and link (18) to straighten out. The closer link (16) and link (18) get to being straight the less outward movement there is of shaft (14).

When shaft (14) first starts moving towards jay (10) not shown, there is little if any mechanical advantage. As shaft (14) nears jay (10) not shown, the mechanical advantage increases. There are two reasons why this occurs. First rivet (48) asserts more upward force as it approaches its apex. Second the angle between link (16) and link (18) is approaching 180 degrees or straight. If shaft (14), link (16) and link (18) were in an upright position and a weight was placed on top of shaft (14). The force needed to raise the weight, by pushing in on pivot point (46A) would decrease as link (16) and link (18) get closer to straight. This is the same premise as the 200 lb ball on top of the rod, described previously.

FIG. (1J) shows a longitudinal cross section view of the end of the present invention. Jay (10) has a spring coils (10E) and is near the center. Shaft (14) exerts so much force, that without the coils (10E), it would straighten V (10) when a fishing hook is secured. Ring (40) fastens to shaft (14) to lessen jay (10) flexing. This increases the gripping ability of the de-hooker. FIG. (3F) illustrates an earlier prototype with a flexing problem and demonstrates the need for ring (40).

FIG. (1K) shows the present invention with a fishing hook (110) secured. It is important for the jay (10) to be positioned as illustrated, with the bottom of jay (10) against the fish (112) and the V (10D) side of the jay (10) away from the fish (112). This will help prevent hook locking as illustrated in FIG. (2B) by prior art. Hook locking occurs when the gap between the de-hooker and point of the fishing hook is to small for the flesh and tissue to go through the gap without being torn.

To further explain proper usage of the de-hooker of the present invention it will be necessary to explain three different situations. This is necessary because the sizes of fish, type and sizes of fishing hooks and the strength of fishing line vary so much. The three different situations are a large fish with strong fishing line, a small fish with strong fishing line and a large fish with weak fishing line. The three examples are at the extreme ends of the spectrum and an angler will usually encounter a combination of the three.

FIG. (1L) shows the first example, a large fish and strong fishing line. In this case the angler would place the body (12) of the de-hooker against the fishing line (114) and pull it towards ones self with the V (10D) part of jay (10) positioned to hook the fishing line (114). Once the line (114) is in V (10D) the angler maintaining line tension slides the de-hooker down the line (114) and positions the fishing hook (110) in the V (10D) the shape of V (10D) makes it easy to position the fishing hook. The trigger (22) is then pulled by hand (118) securing the fishing hook (110). By twisting the de-hooker the fishing hook (110) is removed.

The second example is a small fish with strong fishing line. In this case once the fishing line is in the V (10D) the angler applies enough line tension to pull the fishing hook in to the V (10D). The fishing hook is then secured and removed. FIG. (2A) shows a prior art line tension de-hooker positioning a fishing hook this way.

The third example is a large fish with weak fishing line. In this case the angler is unable to create enough line tension to sufficiently raise the fish out of the water and the fish's movement is barely restrained. It will take a certain amount of skill to position the de-hooker and this is when the design of the de-hooker is so important. Being able to use both hands to position the de-hooker. Having the fishing hook secured at a place where it is easy to position the fishing hook. Not having to reposition the de-hooker because of hook locking and the superior mechanical advantage will make the angler's job much easier.

Additional Embodiments

FIG. (1M)

It will be necessary to produce the de-hooker in a variety of lengths because boats vary so much in size and to compete with standard de-hookers. The de-hooker is designed to make this process easy. All of the parts will be the same except body (12) and shaft (14). Both parts are made from standard materials and are readily available. Since all the milling is done on either end minimum tool set up will be required to produce body (12) and shaft (14) in different lengths. For longer models it will be better if the body (12) is made of stainless steel instead of aluminum.

Injection molding can make some of the parts. The market place will determine this. The high start up cost will require many units be sold to justify injection molding.

For large fish it will be necessary to make the J (10) out of a larger diameter wire or a small rod. The diameter of body (12), shaft (14) and spacers (26) and (28) will need to be increased and these along with some other parts will need to be milled differently. If the fishing hook is large the angler may not be able to fully depress the trigger. It will be necessary to have a way of adjusting J (10) so the trigger can be fully depressed. If the trigger is not fully depressed the de-hooker may not have adequate mechanical advantage to secure the fishing hook.

FIG. (1M) shows one way of being able to adjust Jay (10) so the trigger can be fully depressed. Slot (12B) is lined up with a longitudinal slot, not shown, in tube (13) and Jay (10) bend (10B) is inserted through both slots. Tube (13) is then rotated to place bend (10B) in slot (13A), which is connected to the previous mentioned longitudinal slot, not shown, in tube (13). Stop rings (15) and (17) are fastened to body (12) to keep tube (13) positioned.

Advantages

From the description above many advantages of my de-hooker become evident: Accordingly, besides the objects and advantages of a fish releaser and hook remover with sufficient length to make it safe and easy to remove fishing hooks from the fish while the fish are in the water and the anglers in a boat. All the preceding references are shown in FIG. (1A). Other objects and advantages are:

(a) The V (10D) shape on the end of the de-hooker allows the de-hooker to use line tension to position the fish, fishing hook and de-hooker.

(b) The de-hooker can easily be manufactured in different lengths by changing the length of shaft (14) and body (12). The milling done to shaft (14) and body (12) is the same relative to their ends.

(c) The de-hooker has as much control as possible, considering its length. Control is how easy it is to position the de-hooker, secure and remove the fishing hook.

(d) The V (10D) designed allows the angler to position the fishing hook by pulling up on the de-hooker rather than pushing down. If the process moves the fish it moves towards the angler and the surface. The surface provides a natural counter force making it easier to position the de-hooker.

(e) The V (10D) shape has a specific point where the fishing hook is secured. The point is obvious and easily determined. The shape of V (10D) makes it easy to position the fishing hook at the specific point.

(f) The fishing hook is secured by pulling trigger (22). This requires no arm movement only hand movement. The elimination of arm movement makes it easier to keep the fishing hook positioned correctly while it is being secured.

(g) V (10D) does not move when trigger (22) is pulled. This eliminates the need to adjust the de-hooker in the securing process.

(h) The mechanical system allows shaft (14) to be far enough away from V (10D) not to obstruct the anglers view, making it easier to see if the fishing hook is correctly positioned.

(i) Shaft (14) extends faster at the first part of trigger (22) rotation. This allows minimum trigger squeezing to enclose the fishing hook between jay (10) and shaft (14) making it less likely the fishing hook would not be positioned right before it is secured.

(j) The mechanical advantage is so great that spring coils (10E) are needed to keep from deforming jay (10). The strong mechanical advantage has two advantages.

(k) The hook is more secure and a smaller object can be used to secure the fishing hooks reducing the chances of hook locking and this increases the range of fishing hooks, which the de-hooker can efficiently remove.

(l) When the fishing hook is secured the handle makes it easier to twist the fishing hook out.

(m) When trigger (22) is fully depressed the only force needed to keep the hook secured is enough force to keep spring (24) from pushing trigger (22) back out.

To sum it up the mechanical system is great. Having the mechanical advantage increase as shall (14) nears point (10C) and once trigger (22) is fully depressed the only force needed to keep the fishing hook secured is enough force to keep spring (24) from pushing trigger (22) out. These are truly great features but the most important feature is the way the fishing hook is secured, by shaft (14) moving out to push the fishing hook against jay (10).

FIG. (1F) shows the end of the de-hooker, which secures the fishing hooks. The shape of the jay (10) channels the fishing hook to point (10C) and channeling makes it easier to position the fishing hook. If shaft (14) were designed to channel the fishing hooks the de-hooker would require pushing instead of pulling and the view would be obstructed by the de-hooker, making it harder to tell if the hook was properly positioned. If jay (10) were to move in to push the fishing hook against shaft (14) this would cause several problems. First if the fishing hook is positioned at point (10c) and 90 degrees to the de-hooker when jay (10) starts to move it will cause the fishing hook to lean. If the fishing hook has a short shank or jay (10) is positioned near the eye, there may not be enough shank above jay (10) to hit shaft (14) as it is pushed over. Second if there is enough shank above jay (10) when the fishing hook is pushed over it does not mean it is going to hit shaft (14). The shaft (14) could be made larger so it would almost always hit shaft (14) but this would make it hard to see the fishing hook and would increase the chances of hook locking. The gap between point (10C) and surface (14D) could be made smaller. This would make it less likely the fishing hook would miss the shaft (14) the problem with this is it would make it harder to position the de-hooker and if the fishing hook is leaning to start with the fishing hook may need to be straitened before it will fit in the gap between point 10C) and surface (14D). If jay (10) is fixed and the fishing hook is positioned at point (10C) there is no shifting of the fishing hook as shaft (14) goes out and pushes the fishing hook against jay (10).

CONCLUSION, RAMIFICATIONS AND SCOPE

Many anglers have been hooked, bitten, cut and punctured trying to remove fishing hooks from fish. This process is even more dangerous when one leans over the gunwale and tries to remove a hook or hooks from a fish in the water. The process would be safer for both angler and fish if the de-hookers were longer. A heightened sense of safety would make it more likely an angler would remove the hook or hooks from the fish and doing so while the fish is in the water. A greater working distance allows the angler to be less cautious thus reducing release time. The shortened release time would reduce stress for both angler and fish. Leaving the fish in water would eliminate three major concerns: additional stress, removal of protective slime and damage to vital organs.

The de-hookers design allows various types and sizes of fishing hooks to be gripped without causing hook locking. The mechanical system makes it easier to secure the fishing hook and keep it secured. The two features along with the fact that it can easily be produced in different lengths will make it more likely it will be produced in a similar length to standard de-hooker and specially if it already being produced in the longer lengths.

The most important feature of the de-hooker is the way the fishing hook is secured. Jay (10) must be fixed and shaft (14) must extend out to push the fishing hook against jay (10) to secure the fishing hook. It would be less expense to manufacture the de-hooker if shaft (14) were fixed and jay (10) move. If jay (10) were the moving part shaft (14) would become the shorter of the two parts. Jay (10) has a smaller diameter than shaft (14) there for the material cost will be less and shaft (14) would need less milling this would reduce labor cost.

While my above description contains many specificities, these should not be construed as limitations on the scope of the invention, but rather as an exemplifications of the presently preferred embodiments thereof. Many other ramifications and variations are possible within the teachings of the invention. For example the jay (10) coils (10E) could be eliminated if jay (10) was attached to body (12) by an elastic material such as rubber. Another example is the back link (18) could be left out and the back end of front link (16) would be attached to trigger (22). Trigger (22) would need to be modified. With this modifications shaft (14) could be made to extend out a half inch with a better than 3 to 1 mechanical advantage and there would be no need for jay coil (10E). A third example is the jay (10) V (10D) can be any shape that would channel the fishing hook to point (10A).

Thus the scope of the invention should be determined by the appended claims and their legal equivalents, and not by the examples given.

I claim:

1. A fishhook remover for removing a fishhook from a fish in the water comprising:
    a) an elongated shaft having a longitudinal axis, a proximal end, a distal end, and a fishhook engaging hook at the shaft distal end and attached to and extending from said shaft distal end, said fishhook engaging hook being turned toward said proximal end and having a fishhook trapping point along a longitudinal axis of said fishhook engaging hook;
    b) an elongated clamping rod moveable along said longitudinal axis between a retracted position and an extended position, said clamping rod including a hook engaging distal end to clamp a fishhook between said hook engaging distal end and said fishhook trapping point when said clamping rod is in the extended position, and a proximal end, said clamping rod distal end including a slot which receives therein at least a portion of said fishhook engaging hook which extends within said elongated shaft; and
    c) a hand gripped actuator comprised of:
        i) a handle attached to the proximal end of said shaft; and
        ii) a trigger including a handgrip pivotally attached to said handle, said trigger being connected to the proximal end of said clamping rod by a toggle linkage, whereby movement of said trigger to a retracted position extends said clamping rod to said extended position.

2. The fishhook remover of claim 1, wherein said elongated shaft is tubular, and said clamping rod is slidable within said shaft.

3. The fishhook remover of claim 1, wherein said hook is longitudinally adjustable relative to the distal end of said shaft.

4. The fishhook remover of claim 1, wherein said hook is V-shaped.

5. A fishhook remover for removing a fishhook from a fish in the water comprising:
    a) an elongated shaft having a longitudinal axis, a proximal end and a distal end,
    b) a fishhook engaging hook attached at the shaft distal end and being turned toward said proximal end, said fishhook engaging hook having a fishhook trapping point along a longitudinal axis of said fishhook engaging hook,
    c) a clamp movable along said longitudinal axis between an extended position and a retracted position, said clamp having a distal fishhook engaging end to clamp a fishhook between said fishhook engaging end and said fishhook trapping point when said clamp is in said extended position, and a proximal end, said clamp distal end including a slot which receives therein at least a portion of said fishhook engaging hook which extends within said elongated shaft; and d) a hand gripped actuator comprised of:
   i) a handle attached to the proximal end of said shaft;
   ii) a trigger including a handgrip pivotally attached to said handle; and
   iii) a toggle linkage having an angular alignment and a longitudinal alignment connecting the proximal end of said clamp to said trigger, whereby movement of said trigger to a retracted position toggles said linkage from the angular alignment to the longitudinal alignment and said clamp to said extended position.

6. The fishhook remover of claim 5, wherein said shaft has a hollow bore extending from said proximal end of said shaft to said distal end of said shaft, and said clamp is an elongated rod, said clamp being slidable within said shaft bore between said retracted and extended positions.

7. The fishook remover of claim 1, wherein said clamp distal end includes a slot to receive said hook.

8. The fishhook remover of claim 7, wherein said hook is longitudinally adjustable relative to the distal end of said tubular shaft.

9. The fishhook remover of claim 7, wherein said hook is V-shaped.

10. A fishhook remover for removing a fishhook from a fish in the water comprising:
   a) an elongated tubular shaft having a proximal end, an attachment opening, and a distal end;
   b) a jay spring extending into the distal end of said shaft with a V-shaped hook at a distal end thereof projecting from the distal end of the shaft, said jay spring further including an attachment hook at a proximal end thereof extending into said attachment opening, and an intermediate coil,
   c) an elongated clamping rod slidable within said shaft and said jay spring intermediate coil between a retracted position and an extended position, said clamping rod including a distal end having a forked hook engaging end extending from the distal end of said shaft to clamp a fishhook between said forked end and said V-shaped hook when said clamping rod is in said extended position, and a proximal end, and
   d) a hand gripped actuator comprised of:
      i) a handle attached to the proximal end of said tubular shaft;
      ii) a trigger pivotally attached to said handle by a pivot pin, said trigger including a handgrip extending downwardly from said pivot pin and a toggle connection arm with a guide pin extending upwardly from said pivot pin;
      iii) a first toggle link having a distal end pivotally attached to the proximal end of said clamping rod and a proximal end; and
      iv) a second toggle link having a distal end pivotally attached to said first toggle link proximal end, a longitudinal slot to slidably receive said guide pin, and a proximal end pivotally attached to said handle, whereby movement of said trigger to a retracted position, toggles said links from angular alignment to longitudinal alignment with a longitudinal axis of said clamping rod.

* * * * *